United States Patent [19]
Braat

[11] Patent Number: 4,641,929
[45] Date of Patent: Feb. 10, 1987

[54] BIASPHERICAL LENS

[75] Inventor: Josephus J. M. Braat, Eindhoven, Netherlands

[73] Assignee: U.S. Philips Corporation, New York, N.Y.

[21] Appl. No.: 689,672

[22] Filed: Jan. 7, 1985

[30] Foreign Application Priority Data

Oct. 22, 1984 [NL] Netherlands ............... 8403198

[51] Int. Cl.⁴ ..................... G02B 3/02; G02B 13/18
[52] U.S. Cl. .................................. 350/432; 350/416
[58] Field of Search .................... 350/416, 432–435

[56] References Cited
U.S. PATENT DOCUMENTS 3,535,023  10/1970  Tamanaka et al. ............... 350/432
4,027,952   6/1977  Hugues ............................ 350/432

FOREIGN PATENT DOCUMENTS 55-60912  5/1980  Japan ................................ 350/416

OTHER PUBLICATIONS

Epstein, L.; "A Device for Deflecting Light Beams Through Very Small Angles"; *Applied Optics;* vol. 10, No. 1; p. 73; Jan. 1971.
Born, et al. *Principles of Optics,* 1970, pp. 197–202.
Wassermann; G. D., et al. "On the Theory of Aplanatic Aspheric Systems." *Proc. of the Phys. Soc.,* vol. 62, No. 349B, pp. 2–8 (1949).

*Primary Examiner*—John K. Corbin
*Assistant Examiner*—Scott J. Sugarman
*Attorney, Agent, or Firm*—Marc D. Schechter

[57] ABSTRACT

A single element lens having two aspherical refractive surfaces comprises a lens substrate and two layers of transparent plastic. Each layer has an aspherical outer profile. The lens substrate is a sphere and can be manufactured simply and cheaply.

6 Claims, 2 Drawing Figures

BIASPHERICAL LENS

BACKGROUND OF THE INVENTION

The invention relates to a single lens having two aspherical refractive surfaces. The lens comprises a lens substrate and two layers of transparent plastic having aspherical outer profiles on opposite sides of the substrate.

U.S. Pat. No. 4,027,952 describes a class of lenses having two aspherical surfaces, also referred to as biaspherical lenses. Biaspherical lenses may be suitable for use as objectives in devices for reading optical record carriers containing, for example, video programs or audio programs.

The small dimensions, on the order of 1 μm, of the information carrying structure on these record carriers impose stringent requirements on the objectives. For example, such objectives must be capable of forming diffraction-limited radiation spots having a half-intensity diameter on the order of 1 μm. This means that for the customary wavelength of the read beam, the objective must have a numerical aperture of approximately 0.45. Further, this objective should have a comparatively large diffraction-limited image field on the order of a few hundreds of microns.

Currently, the read devices for optical record carriers are equipped with an objective system which comprises at least three lens components which all have spherical surfaces.

As stated in U.S. Pat. No. 4,027,952 such a composite and expensive objective system can be replaced by a single biaspherical lens. Such a lens can be manufactured simply and cheaply in large quantities using a so-called replication process. This process starts with a substrate, also referred to as preform, of a transparent and stable material such as glass. Both the object side and the image side of the preform are provided with a plastic layer which is in a more or less liquid condition. The plastic may be, for example, an ultraviolet-curable polymerizable material. Dies are pressed onto the plastic layer. The inner surfaces of the dies have shapes which are negatives of the desired aspherical shapes. After curing the layers, for example by exposure to ultraviolet light, the dies are removed and the desired lens is obtained.

To date the manufacture of a biaspherical lens starts with a preform having two spherical surfaces. In order to obtain a maximum image field, the distance between these surfaces, measured along the optical axis, is smaller than the sum of the radii of curvature of the surfaces.

The manufacture of such a preform is rather time consuming and expensive, so that the cost of the resulting biaspherical lens, which is mainly determined by the cost of the preform, is high. It has also been proposed to manufacture biaspherical lenses from preforms already having a certain degree of asphericity. However, the manufacture of such a preform is even more expensive.

Efforts continue to simply and inexpensively mass manufacture devices for reading optical record carriers containing, for example, video programs or audio programs. An important aspect of this is to make the objective system simpler and cheaper without degrading the readout quality.

SUMMARY OF THE INVENTION

It is an object of the present invention to provide a biaspherical lens which is suitable inter alia, as an objective for reading optical record carriers and which can be manufactured simply and cheaply. In the lens according to the invention, the lens substrate is a sphere.

The invention is based on the recognition of the fact that for the uses of the biaspherical lens considered here, the generally recognized disadvantages of spherical lenses, such as a small image field and a large image field curvature, are more than outweighed by the great advantages with respect to production engineering of such a lens.

Preferably, in a biaspherical lens according to the invention, the refractive index of the substrate material lies between approximately 1.45 and approximately 1.65. This low refractive index ensures that for the imaging ratios provided by current optical readers, the lens still has an acceptable free working distance. The free working distance in such readers is the distance between the end surface of the lens and the record carrier.

The lens according to the invention can be employed not only in reading from or writing to optical record carriers, but also in other optical scanning systems in which an object or scene are scanned point-by-point. For example, such lenses may be used in a scanning microscope.

Further, in the design of optical record carrier readers, it is desireable to make the dimensions of the optical scanning unit, and in particular its length, as small as possible. The biaspherical lens according to the invention is very suitable for this purpose.

An optical scanning unit according to the present invention comprises a radiation source which produces a scanning beam, and an objective system for focussing the scanning beam onto the surface to be scanned. The objective system is a single lens according to the invention. The radiation source emits a diverging beam, and the single element lens is arranged directly in the diverging beam (without a radiation collecting element interposed between the source and the lens). The lens according to the invention is very suitable for use in an optical scanning unit having an optical radiation path of minimal length, despite its higher converging power, because by passing a diverging beam into the lens the focus will be situated at an adequate distance from the lens.

Apart from the smaller length, the scanning unit according to the invention has the advantage that unlike the scanning systems known so far it does not require any radiation collecting means.

DESCRIPTION OF THE PREFERRED EMBODIMENTS

Figure 1:
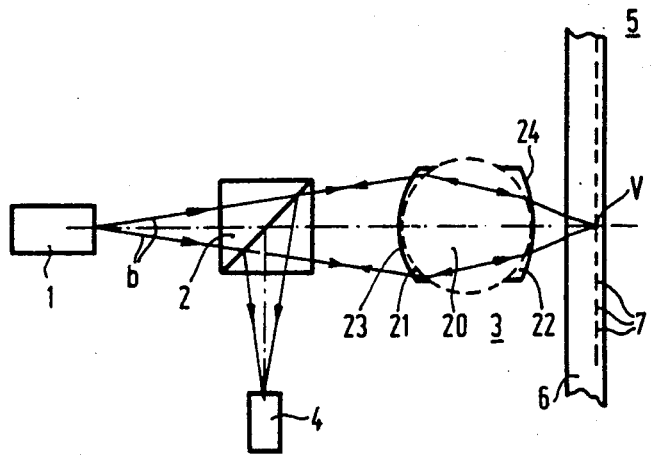
FIG. 1 schematically shows an example of a reader comprising a single biaspherical objective lens according to the invention.

The scanning unit shown in FIG. 1 comprises a radiation source 1, for example a diode laser, a beam splitter 2, for example a beam splitter cube, and an objective lens 3. The reference numeral 5 denotes a small part of a radial cross-section of a record carrier disc.

The information structure of the disc, which is reflecting in the present example, is situated at the rear of the record carrier. The information structure comprises a multitude of information areas, not shown, arranged along information tracks 7. The numeral 6 refers to the transparent substrate of the record carrier, which is traversed twice by the scanning beam.

The information structure is scanned by the read beam b produced by the diode laser 1. The beam emerging from the diode laser 1 is a diverging beam and fills the objective lens 3 adequately. This lens 3 forms a diffraction-limited radiation spot V on the information structure.

The read beam is reflected by the information structure as the record carrier is rotated relative to the read beam, the reflected beam is time-modulated in conformity with the information stored in the record carrier. By means of the beam splitter cube 2, the modulated beam is separated from the beam emitted by the source 1 and is diverted to a radiation-sensitive detection system 4. The detector 4 supplies an electric signal which is time modulated in conformity with the information stored.

Figure 2:
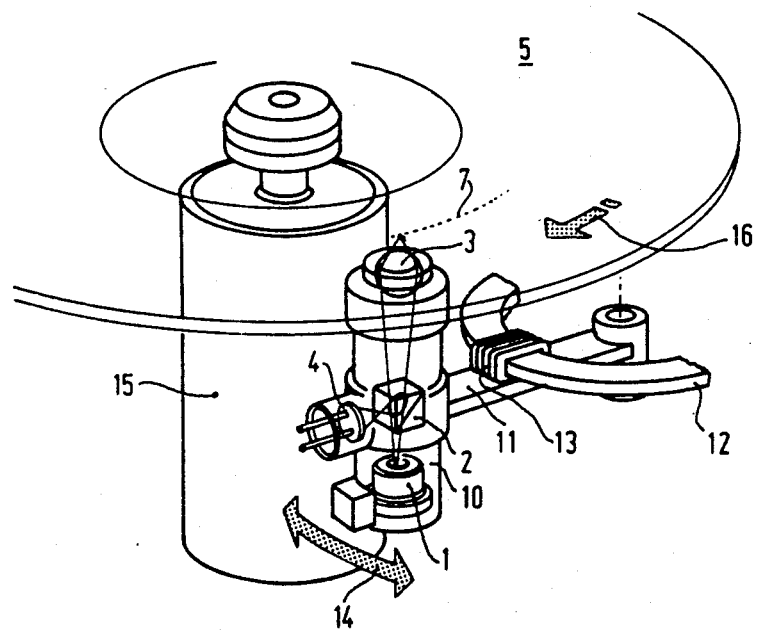
FIG. 2 is a perspective view of a record player equipped with such a reader.

As shown in FIG. 2 the elements 1, 2, 3 and 4 may be accommodated in a tube 10 which is mounted on a pivotal arm 11. The pivotal arm 11 is movable relative to the record carrier 5 in the direction indicated by the arrow 14, i.e. substantially transverse to the longitudinal direction of the information tracks 7. The record carrier is rotated by a motor 15, so that the information tracks are moved relative to the read spot V in the direction indicated by the arrow 16.

In the record player shown in FIG. 2, the entire reader accommodated in the tube 10 is moved both for coarse control and for fine control of the position of the radiation spot V relative to the center of the track to be read. As a result, the objective lens is required to have only a limited image field. Instead of a pivotal arm it is possible to employ a rectilinearly movable slide for coarse and fine positioning of the radiation spot relative to the track center.

As shown in FIG. 1, the biaspherical lens comprises a lens substrate or preform 20. Two thin layers 21 and 22 having aspherical outer profiles 23 and 24 are provided on opposite sides of the substrate. These layers consist of a transparent plastic, for example a plastic which is polymerizable by ultraviolet light. This plastic can be soft when deposited onto the lens preform. Then, a die whose profile is complementary to the desired aspherical profile is pressed into the plastic. Subsequently, the plastic is exposed, for example through the die, and the die is removed so that the finished lens is obtained without any further operations.

According to the invention, the lens preform is a sphere of, for example, glass or quartz. Such a sphere can be obtained in simple and cheap manner by the use of mechanical techniques known per se. For example, square glass blocks may be used which are spun around in a drum until substantially spherical elements are obtained. These spherical elements may be polished, if necessary.

Apart from the fact that aspherical preform can be manufactured cheaply, a sphere has the advantage that it is automatically aligned during the replication process. The comparatively small image field of the spherical lens is still adequate for the uses envisaged here.

The aspherical surfaces of the finished lens are defined unambiguously by the choice of the paraxial curvatures of the surfaces, i.e. the curvatures where the surfaces intersect the optical axis, i.e. by the radius of the sphere. The other points of the aspherical surfaces are computed according to the criteria that the Abbe sine condition should be met and that the lens be free from spherical aberration. This means that the optical path length is the same for all the rays from the object point on the axis to the associated image point on the axis.

These conditions may be computed in a manner described in *Principle of Optics* (1970), by Born and Wolf, pages 197-202 and in the article "On the Theory of Aplanatic Aspheric Systems" by Wasserman and Wolf (*Proc. Phys. Soc.*, Vol. 62, No. 349B (1949), pages 2 to 8. Eventually this results in a collection of discrete points for each of the desired aspherical surfaces. If desired, approximate curves represented by series expansions may be drawn through this collection of curves. The coefficients of these series expansions then define the aspherical surfaces unambiguously.

In a practical embodiment of an objective intended for reading, through a substrate 6 having a thickness of approximately 1.2 mm, an information structure whose track period is approximately 1.7 $\mu$m, whose track width is approximately 0.7 $\mu$m, and whose average informationarea length is on the order of 1 $\mu$m, the lens preform comprises a quartz sphere having a refractive index of approximately 1.45 and a radius of approximately 2.5 mm. The layers 21 and 22 consist of an ultraviolet-curable material having a refractive index of approximately 1.56. The objective has a focal length of approximately 3.8 mm and forms a radiation spot whose half intensity diameter is approximately 1 $\mu$m. The lens has a numerical aperture of approximately 0.45. The image field has a radius of approximately 75 $\mu$m and the distance between the lens and the front surface of the record carrier is approximately 1.3 mm.

When glass having a refractive index of 1.55 is employed as the material for the sphere, the last-mentioned distance is approximately 0.9 mm and the radius of the sphere is approximately 3 mm.

The quartz substrate objective lens is suitable for use both in combination with a helium-neon laser beam having a wavelength of approximately 633 nm and a diode laser beam having a wavelength of approximately 785 nm. The change in spherical aberration of the substrate due to the change in wavelength can be compensated for substantially by the attendant variation of the dispersion in the aspherical layers.

The fact that the invention has been described for a reader does not mean that it is limited thereto. The single biaspherical lens may also be employed in an apparatus for writing on optical record carriers, which apparatus in principle has the same construction as the reader but operates with a higher radiation intensity. The intensity is modulated in conformity with the information to be recorded.

In addition, the invention may be employed in other optical scanning systems, such as a scanning microscope. In general, the invention can be used in imaging systems comprising small lenses which are required to have high imaging quality and a limited image field.

What is claimed is:

1. An lens having two aspheric refractive surfaces, said lens comprising:
    a lens substrate, said lens substrate being a sphere; and
    first and second layers of transparent plastic on the substrate, said first layer being arranged on a first side of the substrate, said second layer being arranged on a second side of the substrate opposite to the first side, each layer having an aspheric outer surface.

2. A lens as claimed in claim 1, characterized in that the substrate has a refractive index between approximately 1.45 and 1.65.

3. An optical scanning unit comprising:
a radiation source which emits a diverging radiation beam; and
an objective lens for focusing the diverging radiation beam to form a radiation spot on a surface to be scanned, said lens comprising:
a lens substrate, said lens substrate being a sphere; and
first and second layers of transparent plastic on the substrate, said first layer being arranged on a first side of the substrate, said second layer being arranged on a second side of the substrate opposite to the first side, each layer having an aspheric outer surface.

4. An optical scanning unit as claimed in claim 3, characterized in that the substrate has a refractive index between approximately 1.45 and 1.65.

5. An optical scanning unit as claimed in claim 3, characterized in that the unit has no radiation collecting element between the radiation source and the lens.

6. An optical scanning unit as claimed in claim 5, characterized in that the substrate has a refractive index between approximately 1.45 and 1.65.

* * * * *